US00RE48559E

(19) United States
(12) Reissued Patent
Park et al.

(10) Patent Number: US RE48,559 E
(45) Date of Reissued Patent: May 18, 2021

(54) CLOTHES TREATMENT APPARATUS

(71) Applicant: LG ELECTRONICS INC., Seoul (KR)

(72) Inventors: Jumin Park, Seoul (KR); Duckwoo Ahn, Seoul (KR); Youngjin Doh, Seoul (KR); Hyunggyu Lim, Seoul (KR)

(73) Assignee: LG ELECTRONICS INC., Seoul (KR)

(21) Appl. No.: 16/180,206

(22) Filed: Nov. 5, 2018

Related U.S. Patent Documents

Reissue of:
(64) Patent No.: 9,809,924
Issued: Nov. 7, 2017
Appl. No.: 14/974,050
Filed: Dec. 18, 2015

(30) Foreign Application Priority Data

Dec. 19, 2014 (KR) ..... 10-2014-0184456
Dec. 19, 2014 (KR) ..... 10-2014-0184457

(51) Int. Cl.
*D06F 71/02* (2006.01)
*D06F 58/10* (2006.01)
*D06F 73/02* (2006.01)

(52) U.S. Cl.
CPC ..... *D06F 71/026* (2013.01); *D06F 71/02* (2013.01); *D06F 58/10* (2013.01); *D06F 73/02* (2013.01)

(58) Field of Classification Search
CPC ..... D06F 67/005; D06F 58/10; D06F 73/02; D06F 71/30; D06F 73/00
See application file for complete search history.

(56) References Cited

U.S. PATENT DOCUMENTS 1,882,214 A * 10/1932 Etten ..... D06F 71/04 38/25
3,117,704 A 1/1964 McMillan
(Continued)

FOREIGN PATENT DOCUMENTS

CN 1037557 11/1989
CN 2123546 12/1992
(Continued)

OTHER PUBLICATIONS

Korean Office Action dated Mar. 26, 2019 issued in Application No. 10-2019-0014938.
(Continued)

*Primary Examiner* — Terrence R Till
(74) *Attorney, Agent, or Firm* — Ked & Associates, LLP

(57) ABSTRACT

A clothes treatment apparatus includes a cabinet that defines a treatment chamber. The clothes treatment apparatus further includes a door that is configured to open and close at least a portion of the cabinet. The clothes treatment apparatus further includes a wrinkle removal module that is located on an inside of the door, that is configured to remove wrinkles from clothes by applying pressure to the clothes. The wrinkle removal module includes a base plate that is located at the door and that is configured to support clothes. The wrinkle removal module further includes a press plate that is coupled to the base plate, that is configured to rotate relative to the base plate, and that is configured to remove wrinkles from clothes based on pressing against the base plate.

20 Claims, 8 Drawing Sheets

Amended

(56) References Cited

U.S. PATENT DOCUMENTS

| | | | | |
|---|---|---|---|---|
| 3,203,122 | A | 8/1965 | Sweatt | |
| 3,397,472 | A | 8/1968 | Topliffe | |
| 4,493,160 | A | 1/1985 | Brembilla | |
| 5,305,484 | A * | 4/1994 | Fitzpatrick | D06F 73/02 223/70 |
| 5,474,216 | A | 12/1995 | Harrod | |
| 5,815,961 | A | 10/1998 | Estes | |
| D597,272 | S * | 7/2009 | Auguste | D32/66 |
| 7,603,801 | B2 | 10/2009 | Jiang et al. | |
| 9,309,618 | B2 * | 4/2016 | Park | D06F 73/02 |
| 2002/0195914 | A1 | 12/2002 | Albaizar et al. | |
| 2009/0064530 | A1 | 3/2009 | Moon | |
| 2009/0241269 | A1 | 10/2009 | Yoo | |
| 2012/0018461 | A1 | 1/2012 | Azizian | |
| 2013/0097896 | A1 | 4/2013 | Moon et al. | |

FOREIGN PATENT DOCUMENTS

| | | | |
|---|---|---|---|
| CN | 2126854 | | 2/1993 |
| CN | 1170061 | | 1/1998 |
| CN | 1081702 | | 3/2002 |
| CN | 1346921 | | 5/2002 |
| CN | 1729332 | | 2/2006 |
| CN | 201738157 | | 2/2011 |
| CN | 104294529 | | 1/2015 |
| DE | 2017394 | | 10/1971 |
| EP | 0 253 048 | | 1/1988 |
| EP | 0 324 589 | | 7/1989 |
| EP | 0 816 552 | | 1/1998 |
| EP | 1 159 893 | | 12/2001 |
| EP | 1159893 | A2 * | 12/2001 |
| EP | 2 322 707 | | 5/2011 |
| EP | 2 826 911 | | 1/2015 |
| EP | 2 889 426 | | 7/2015 |
| JP | 47-034352 | | 5/1971 |
| JP | S50-085866 | | 7/1975 |
| JP | 53-075638 | | 11/1976 |
| JP | 54-181183 | | 6/1978 |
| JP | 63-82700 | | 4/1988 |
| JP | H 01-274799 | | 11/1989 |
| JP | H05-068795 | | 3/1993 |
| JP | 10-080331 | | 3/1998 |
| JP | 2000-051585 | | 2/2000 |
| JP | 2002-177698 | | 6/2002 |
| KR | 10-2001-0113436 | | 12/2001 |
| KR | 10-0444005 | | 11/2004 |
| KR | 10-2008-0078367 | | 8/2008 |
| KR | 10-2010-0067780 | | 6/2010 |
| KR | 10-2011-0021167 | | 3/2011 |
| KR | 10-2011-0048344 | | 5/2011 |
| KR | 10-2012-0078278 | | 7/2012 |
| KR | 10-2012-0091799 | | 8/2012 |
| KR | 10-2013-0017029 | | 2/2013 |
| KR | 30-0704405 | | 8/2013 |
| WO | WO 02/052087 | | 7/2002 |
| WO | WO 2008/007200 | | 1/2008 |

OTHER PUBLICATIONS

Korean Office Action dated Apr. 30, 2019 issued in Application No. 10-2013-0150441.

Japanese Office Action dated Aug. 9, 2018 issued in JP Application No. 2017-532881.

Japanese Notice of Allowance dated Jul. 2, 2019 issued in JP Application No. 2017-532881.

European Search Report dated Nov. 21, 2014 issued in Application No. 14176862.2.

European Search Report dated Jun. 2, 2015 issued in Application No. 14195999.9.

Chinese Office Action dated Dec. 3, 2015 issued in Application No. 201410340593.6.

Chinese Office Action dated May 5, 2016 issued in Application No. 201410736887.0 (English translation attached).

United States Office Action dated Feb. 24, 2017 issued in U.S. Appl. No. 14/974,050.

United States Office Action dated Aug. 10, 2015 issued in U.S. Appl. No. 14/332,161.

U.S. Office Action dated May 27, 2020 issued in U.S. Appl. No. 16/150,515.

United States Office Action dated Aug. 4, 2020 issued in co-pending related U.S. Appl. No. 16/150,401.

Definition of "clip" from :// /www.lexico.com/definition/clip (Year: 2020).

Korean Notice of Allowance dated Jun. 16, 2020 issued in Application No. 10-2020-0021152.

Chinese Patent Certificate No. 108193464 (Application No. 201810200013.1) dated Jul. 3, 2020 (English Abstract attached).

Japanese Office Action dated Sep. 15, 2020 issued in JP Application No. 2019-142078.

Extended European Search Report issued in European Application No. 15201190.4 dated Apr. 22, 2016, 11 pages.

International Search Report and Written Opinion in International Application No. PCT/KR2015/014024, dated Apr. 20, 2016, 9 pages.

* cited by examiner

FIG. 1 - Amended

CLOTHES TREATMENT APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a Reissue of U.S. Pat. No. 9,809,924, which* claims the priority benefit of Korean Patent Application No. 10-2014-0184456, filed on Dec. 19, 2014 and Application No. 10-2014-0184457, filed on Dec. 19, 2014 in the Korean Intellectual Property Office, the disclosure of which is incorporated herein by reference.

FIELD

The present disclosure relates to a clothes treatment apparatus.

BACKGROUND

Clothes treatment apparatuses are apparatuses that treat clothes, e.g., wash and dry clothes and smooth wrinkles in clothes, at home or at laundromats.

Clothes treatment apparatuses may be classified into a washer for washing clothes, a dryer for drying clothes, a washer/dryer having both a washing function and a drying function, a refresher for refreshing clothes, and a steamer for removing unnecessary wrinkles in clothes.

The refresher is an apparatus that keep clothes comfortable and fresh. The refresher functions to dry clothes, to supply fragrance to clothes, to prevent the occurrence of static electricity in clothes, or to remove wrinkles from clothes.

The steamer is an apparatus that supplies steam to clothes in order to remove wrinkles from the clothes. Unlike a general iron, the steamer removes wrinkles from the clothes without directly applying heat to the clothes.

SUMMARY

According to an innovative aspect of the subject matter described in this application, a clothes treatment apparatus includes a cabinet that defines a treatment chamber; a door that is configured to open and close at least a portion of the cabinet; and a wrinkle removal module that is located on an inside of the door, that is configured to remove wrinkles from clothes by applying pressure to the clothes, and that includes a base plate that is located at the door and that is configured to support clothes; and a press plate that is coupled to the base plate, that is configured to rotate relative to the base plate, and that is configured to remove wrinkles from clothes based on pressing against the base plate.

The clothing treatment apparatus may include one or more of the following optional features. At least a portion of the base plate is separated from the door by a predetermined distance. The base plate includes a material that generates an elastic force that presses the base plate against the press plate. The press plate includes a material that generates an elastic force that presses the press plate against the base plate. The press plate is configured to rotate relative to the base plate in upward and downward directions or in leftward and rightward directions. At least one of the base plate or the press plate includes a press avoiding part that is configured to receive a sewn part of clothes and that defines a groove.

The base plate includes a fixed base part that is fixed to the door; and an elastic base part that extends from the fixed base part, that is separated from the door by a greater distance than the fixed base part, and that is configured to support clothes using elastic force. The fixed base part includes a press avoiding part that is configured to receive a sewn part of clothes and that defines a groove. The fixed base part is configured to be closer to the door than the elastic base part. The fixed base part includes a fastening part that protrudes toward the door, that is supported by the door, and that is configured to separate the fixed base part from the door. The base plate is configured to rotate about the fastening part through a predetermined angle based on being pressed by the press plate.

The elastic base part includes a left elastic base part that extends from the fixed base part in a leftward direction; and a right elastic base part that extends from the fixed base part in a rightward direction. The press plate defines an opening that is configured to expose clothes to the treatment chamber. The base plate further includes an elastic member that is located between the elastic base part and the door and that is configured to provide elastic force to the elastic base part. The base plate further includes an elastic member fixing part that is located at the elastic base part, that protrudes toward the door, that is configured to connect at least a portion of the elastic base part to the elastic member fixing part. The elastic member is a coil spring, and at least a portion of the coil spring is connected to the elastic member fixing part.

The wrinkle removal module further includes a first hinge that is coupled to a first side of the base plate, that is coupled to a first side of the press plate, and that is configured to allow rotation of the press plate; a second hinge that is coupled to the first side of the base plate, that is coupled to the first side of the press plate, and that is configured to allow rotation of the press plate; and a latch that is located at a second side of the base plate or a second side of the press plate, that is located opposite the first hinge and the second hinge, and that is configured to latch the press plate and the base plate. The wrinkle removal module further includes a cap cover that is located between the first hinge and the second hinge and that is located between the base plate and the press plate. The wrinkle removal module further includes a camouflage cover that is located at the second side of the base plate or the second side of the press plate and that is located at positions opposite the first hinge, the second hinge, and the cap cover.

According to another innovative aspect of the subject matter described in this application, a clothes treatment apparatus includes a cabinet that defines a treatment chamber; a door that is configured to open and close at least a portion of the cabinet; and a wrinkle removal module that is located on an inside of the door, that is configured to remove wrinkles from clothes by applying pressure to the clothes, and that includes a base plate that is located at the door and that is configured to support clothes; a press plate that is coupled to the base plate, that is configured to rotate relative to the base plate, that is configured to remove wrinkles from clothes based on pressing against the base plate, and that defines an opening that is configured to expose clothes to the treatment chamber; a first hinge that is coupled to a first side of the base plate, that is coupled to a first side of the press plate, and that is configured to allow rotation of the press plate; a second hinge that is coupled to the first side of the base plate, that is coupled to the first side of the press plate, and that is configured to allow rotation of the press plate; and a latch that is located at a second side of the base plate or a second side of the press plate, that is located opposite the first hinge and the second hinge, and that is configured to latch the press plate and the base plate, where the base plate includes a fixed base part that is fixed to the door; and an elastic base part that extends from the fixed base part, that is separated from the door by a greater distance than the fixed base part, and that is configured to support clothes using elastic force.

It is an object of the subject matter described in this application to provide a clothes treatment apparatus that includes a wrinkle removal module that is capable of removing wrinkles from trousers and is configured such that the direction in which the wrinkle removal module is opened and closed can be reversed.

It is another object of the subject matter described in this application to provide a clothes treatment apparatus that is capable of uniformly pressing trousers when the trousers are hung in the clothes treatment apparatus.

DETAILED DESCRIPTION

Figure 1:
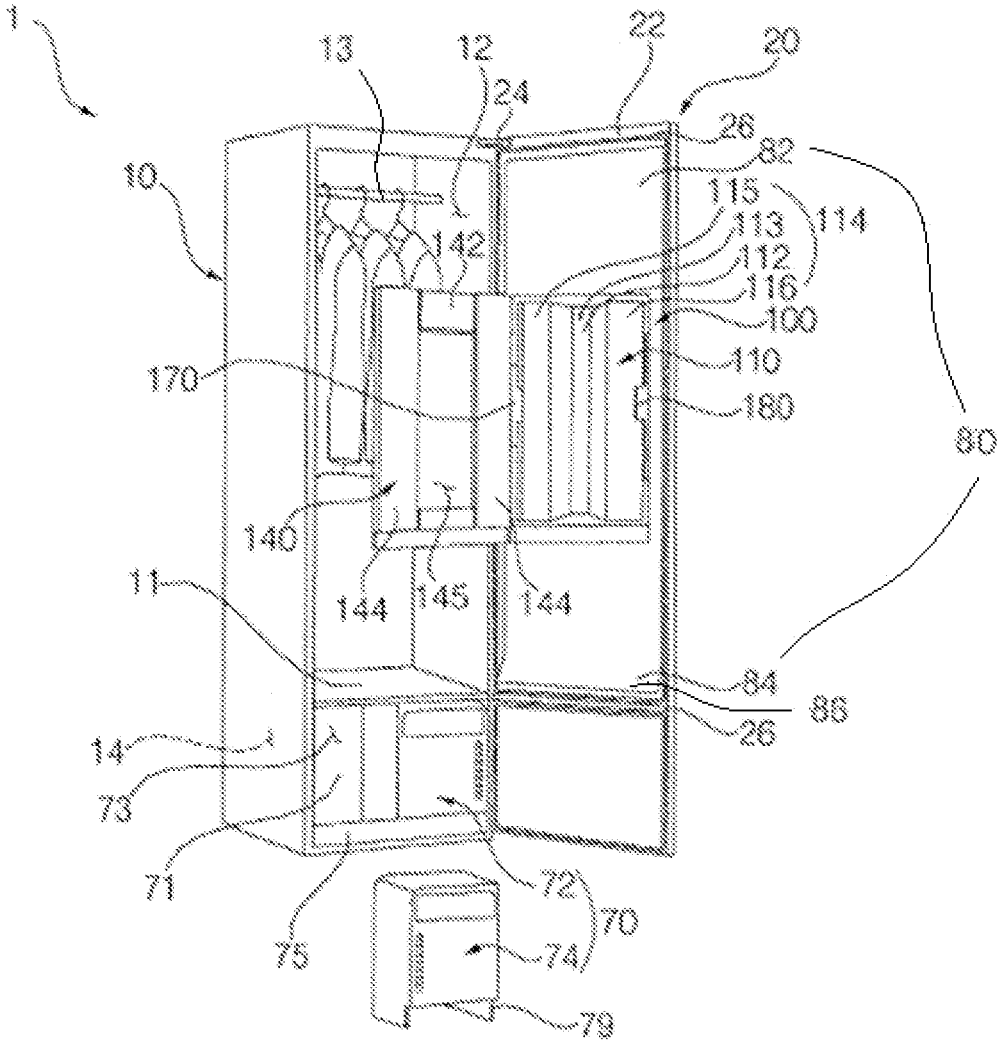
FIG. 1 is a perspective view of an example clothes treatment apparatus.
Figure 2:
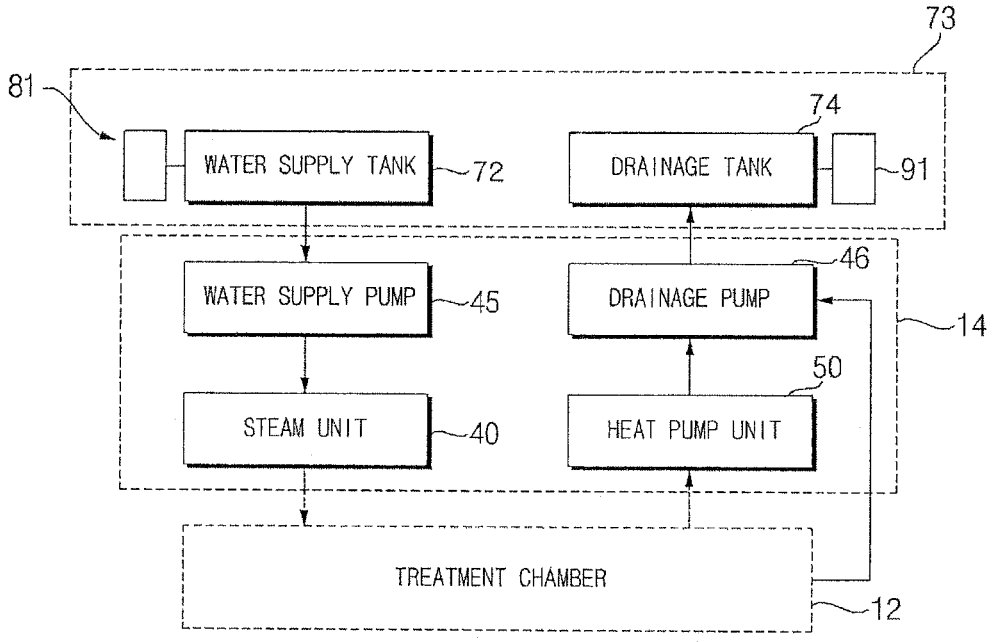
FIG. 2 is a block diagram of an example clothes treatment apparatus.
Figure 3:
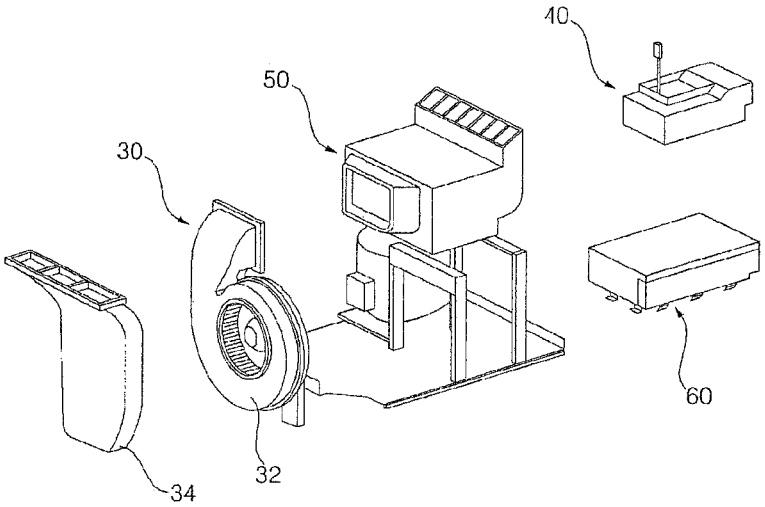
FIG. 3 is an exploded perspective view of an example cycle assembly.
Figure 4:
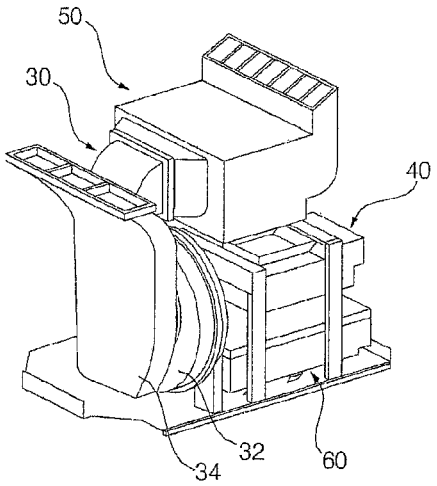
FIG. 4 is a perspective view of an example cycle assembly.

FIGS. 1 and 2 illustrate example clothes treatment apparatuses. FIGS. 3 and 4 illustrate example cycle assemblies.

The clothes treatment apparatus 1 includes a cabinet 10, which defines a treatment chamber 12 that is open at the front thereof, and a door 20 configured to open and close the front of the cabinet 10.

The interior of the cabinet 10 is partitioned into upper and lower interior parts by a partition plate 11. A treatment chamber 12, in which clothes are hung, is defined in the interior of the cabinet 10 above the partition plate 11. A cycle chamber 14, in which machinery is installed, is defined in the interior of the cabinet 10 below the partition plate 11.

Clothes are hung in the treatment chamber 12. In the treatment chamber 12, wrinkles in the clothes are smoothed, or the clothes are deodorized, by the circulation of steam or air.

A hanger support bar 13 configured to support clothes hangers, on which clothes are hung, is provided in the upper part of the treatment chamber 12. The hanger support bar 13 may be configured to be moved in the treatment chamber 12 in forward and rearward directions, in upward and downward directions, and/or in leftward and rightward directions by a driving device, such as a motor. The hanger support bar 13 may be periodically reciprocated.

An air blowing port [16] and a steam discharge port [17] are formed in the treatment chamber 12.

In some implementations, the air blowing port [16] and the steam discharge port [17] are formed in a discharge panel[15].

In some implementations, the air blowing port [16] and the steam discharge port [17] may be formed in different panels.

In some implementations, the discharge panel [15] constitutes a portion of the cycle chamber 14. The discharge panel [15] is located at the rear side of the partition plate 11. The discharge panel [15] and the partition plate 11 form a continuous surface. The discharge panel [15] is inclined toward the partition plate 11.

Air blown by a blowing unit 30 is discharged through the air blowing port[16].

Steam generated by a steam unit 40 is discharged through the steam discharge port[17].

A blowing unit 30 for circulating air in the treatment chamber 12, a steam unit 40 for supplying steam into the treatment chamber 12, a heat pump unit 50 for conditioning air in the treatment chamber 12, and a control unit 60 for controlling the respective units 30, 40, and 50 are installed in the cycle chamber 14.

In some implementations, an assembly of machinery, including the blowing unit 30, the steam unit 40, the heat pump unit 50, and the control unit 60, which are required to perform respective cycles of the clothes treatment apparatus, is defined as a cycle assembly.

The blowing unit 30 includes a blowing fan 32 and an inlet duct 34.

The inlet duct 34 is installed at the suction side of the blowing fan 32 to guide air in the treatment chamber 12 to the blowing fan 32.

The blowing fan 32 is rotated to blow air. The blowing fan 32 suctions air from the treatment chamber 12, and discharges the suctioned air to the heat pump unit 50.

When the steam unit 40 is powered on, heat is generated from the steam unit 40. The steam unit 40 converts water supplied from a water supply tank 72, which will be described hereinafter, into steam. The generated steam is discharged into the treatment chamber 12.

In some implementations, a flow channel is defined such that the steam flows into the treatment chamber 12 via the heat pump unit 50.

The heat pump unit 50 constitutes a heat pump cycle including a compressor, a condenser, an evaporator, and an expansion valve. Based on the operation mode of the heat pump unit 50, cooled air or heated air may be discharged into the treatment chamber 12.

In some implementations, the heat pump unit 50 may heat air around the condenser through heat exchange with a refrigerant, and may supply the heated air into the treatment chamber 12 through the blowing unit 30. The high-temperature air, which is supplied into the treatment chamber 12, is used to treat clothes that are hung on the clothes hangers, which are supported by the hanger support bar 13. Of course, in a case which the heat pump unit 50 is not operated, but only the blowing unit is operated, room-temperature air is supplied into the treatment chamber 12. In addition, air cooled by the evaporator may be supplied into the treatment chamber 12 through the blowing unit 30.

The heat pump unit 50 may dehumidify the air in the treatment chamber 12.

A tank module 70 for storing water is installed in front of the cycle chamber 14. The tank module 70 includes a water supply tank 72 for supplying water to the steam unit 40 and a drainage tank 74 for collecting and storing condensed water that is generated in the treatment chamber 12.

A water supply level sensor 81 for sensing the level of water stored in the water supply tank 72 is installed in the water supply tank 72, and a drainage level sensor 91 for sensing the level of water stored in the drainage tank 74 is installed in the drainage tank 74.

Water from the water supply tank 72 flows to the steam unit 40 via a water supply pump 45.

Water that is condensed in the treatment chamber 12 flows to the lower side of the treatment chamber 12 due to gravity, and is then pumped to the drainage tank 74 by a drainage pump 46. Water that is condensed in the heat pump unit 50 also flows to the drainage tank 74 via the drainage pump 46.

The water supply pump 45 or the drainage pump 46 is controlled by the control unit 60.

In some implementations, a tank module frame 71 is installed in front of the inlet duct 34.

A tank installation space 73 is defined between the tank module frame 71 and the door 20. The tank module frame 71 is coupled to the partition plate 11 to isolate the cycle chamber 14 from the outside.

A tank support bar 75, which interferes with at least one selected from between the water supply tank 72 and the drainage tank 74, is installed in front of the tank installation space 73.

The tank support bar 75 prevents the water supply tank 72 or the drainage tank 74 from being unintentionally separated from the tank installation space 73. The tank support bar 75 supports the front of the water supply tank 72 and the front of the drainage tank 74.

When the door 20 is opened and closed, therefore, the water supply tank 72 and the drainage tank 74 are prevented from being separated from the tank installation space 73.

In some implementations, the lower end of the water supply tank 72 is placed on the upper end of the tank support bar 75, and the lower end of the drainage tank 74 is placed on the upper end of the tank support bar 75.

A tank support end 79, which interferes with the tank support bar 75, is formed on at least one selected from between the water supply tank 72 and the drainage tank 74.

The tank support end 79 is concavely recessed.

The front of the tank support bar 75 and the front of the water supply tank 72 may form a continuous surface due to the tank support end 79. In addition, the front of the tank support bar 75 and the front of the drainage tank 74 may form a continuous surface due to the tank support end 79.

The water supply tank 72 and the drainage tank 74 are disposed in the tank installation space 73 such that the water supply tank 72 and the drainage tank 74 are arranged parallel to each other in rightward and leftward directions.

When the door 20 is opened, the water supply tank 72 and the drainage tank 74 are exposed to a user.

The water supply tank 72 and the drainage tank 74 may be withdrawn by the user.

The water supply tank 72 and the drainage tank 74 may be separated from the tank module frame 71. The water supply tank 72 and the drainage tank 74 may be separably mounted in the tank installation space 73.

The water supply tank 72 is connected to the steam unit 40 to supply water to the steam unit 40. The drainage tank 74 is connected to the treatment chamber 12 to store water discharged from the treatment chamber 12 or the heat pump unit 50.

The drainage tank 74 is identical in function to the water supply tank 72. The drainage tank 74 is disposed alongside the water supply tank 72.

The door 20 includes a door panel 22 for opening and closing the front of the cabinet 10, a hinge unit 24 for connecting the door panel 22 and the cabinet 10 in a hinged fashion, a door gasket 26 disposed at the door panel 22 such that the door gasket 26 is in tight contact with the edge of the cabinet 10 to achieve a seal between the door 20 and the cabinet 10, and a door liner 80 disposed at the inside of the door panel 2 for guiding condensed water that is generated in the treatment chamber 12 to the partition plate 11.

In some implementations, the door 20 is configured to have a structure that simultaneously opens and closes the treatment chamber 12 and the tank installation space 73. In some implementations, a plurality of doors may be mounted to the cabinet 10 such that the respective doors can open and close the treatment chamber 12 and the tank installation space 73.

The door liner 80 is disposed toward the treatment chamber 12.

The door liner 80 guides condensed water that is generated on the surface thereof to a drainage grill [13] formed at the partition plate 11.

The door liner 80 includes a liner part 82, which is attached to the inside of the door panel 22 such that the liner part 82 is parallel to the door panel 22, and a liner guide part 84, which is formed at the lower end of the liner part 82 such that the liner guide part 84 is deviated toward the inside of the treatment chamber 12.

The door liner 80 is located at the upper side of the partition plate 11. The door liner 80 may have an area slightly less than the area of the front of the treatment chamber 12.

The door gasket 26 may be mounted to the door panel 22 such that the door gasket 26 surrounds the door panel 22. The seal between the door 20 and the cabinet 10 may be achieved by the door gasket 26.

The door gasket 26 may individually seal the treatment chamber 12 and the tank installation space 73.

The door gasket 26 may prevent condensed water that is generated in the treatment chamber 12 from flowing to the tank installation space 73.

The liner part 82 is in tight contact with the door panel 22.

In some implementations, the liner guide part 84 is integrally formed with the liner part 82. In some implementations, the liner part 82 and the liner guide part 84 may be manufactured separately.

The liner guide part 84 is disposed such that the liner guide part 84 is deviated from the liner part 82 toward the treatment chamber 12. The liner guide part 84 may be formed to have a round shape or an inclined surface.

The liner guide part 84 may protrude from the door 20 toward the inside of the treatment chamber 12.

A drop part 86 is formed at the lower end of the liner guide part 84. The drop part 86 may be formed to have an undercut shape. The drop part 86 functions to increase the size of droplets of condensed water and to drop the droplets downward.

A portion of the door gasket 26 may be disposed at the lower side of the liner guide part 84. The door gasket 26 prevents condensed water that is generated in the treatment chamber 12 from falling to the tank installation space 73.

In some implementations, the clothes treatment apparatus further includes a wrinkle removal module 100 for applying pressure to clothes to remove wrinkles from the clothes. The wrinkle removal module 100 is installed at the door 20. In some implementations, the wrinkle removal module 100 may be installed in the treatment chamber 12.

The wrinkle removal module 100 is installed at the position to which steam is supplied.

The wrinkle removal module 100 includes a base plate 110 installed at the inside of the door 20 for supporting clothes (e.g., trousers) 105, from which wrinkles are to be removed, and a press plate 140 configured to be brought into tight contact with the base plate 110 for pressing the trousers 105.

The trousers 105 are hung on a hanger member 120. The hanger member 120, on which the trousers 105 are hung, is supported by a support part 25 disposed inside the door 20.

In some implementations, a general trousers hanger is used as the hanger member 120. Other kinds of hanger members for hanging scarves, mufflers, etc. may be used. The shape of the hanger member 120 may be variously modified.

A plurality of support parts 25 is disposed at the inside of the cabinet 10 such that the support parts 25 are arranged in a vertical direction. One of the support parts 25 is selected based on the length of trousers from which wrinkles are to be removed.

The base plate 110 is installed at the door 20. The base plate 110 may be installed at the door panel 22 or the door liner 80.

The base plate 110 is formed to have a plate shape that exhibits high elasticity. At least a portion of the base plate 110 is spaced apart from the door 20.

Condensed water formed on the door 20 may move to the liner guide part 84 through a gap defined between the base plate 110 and the door 20.

At least a portion of the base plate 110 is spaced apart from the door liner 80. As a result, the condensed water formed on the door 20 is prevented from contacting clothes.

In some implementations, the press plate 140 may be formed of an elastic material. In some implementations, the base plate 110 may be formed of a hard material, and the press plate 140 may be formed of an elastic material. In some implementations, clothes may be brought into tight contact with the base plate 110 by the elastic force provided by the press plate 140.

In some implementations, the base plate 110 is manufactured using a single plate. In some implementations, the base plate 110 may be manufactured by assembling a plurality of plates.

A groove is formed in the portion of the base plate 110 at which a sewn part 106 of the trousers is located. Interference between the base plate 110 and the sewn part 106 of the trousers is avoided, and the contact area between the base plate 110 and the trousers is maximized.

The base plate 110 is provided with a press avoiding part 111, at which the sewn part 106 of the trousers is located.

The base plate 110 includes a fixed base part 112, which is fixed to the door 20, and an elastic base part 114 extending from the fixed base part 112, the elastic base part 114 being configured to be spaced further apart from the door 20 than the fixed base part 112.

In some implementations, the fixed base part 112 extends in upward and downward directions. The fixed base part 112 is provided at upper and lower sides thereof with fastening parts 113, through which the fixed base part 112 is coupled to the door 20.

The elastic base part 114 provides the elastic force necessary to support clothes. The elastic base part 114 elastically supports clothes such that the clothes are brought into tight contact with the elastic base part 114.

The elastic base part 114 includes a left elastic base part 115 extending from the fixed base part 112 in a leftward direction and a right elastic base part 116 extending from the fixed base part 112 in a rightward direction.

When external force is applied to the left elastic base part 115 and the right elastic base part 116, the left elastic base part 115 and the right elastic base part 116 may be elastically deformed toward the door 20. When the external force applied to the left elastic base part 115 and the right elastic base part 116 is removed, the left elastic base part 115 and the right elastic base part 116 may return to their original states.

When the base plate 110 is pressed by the press plate 140, the base plate 110 may be rotated or twisted about the fastening parts 113 by a predetermined angle. As a result, the press plate 140 is brought into uniform contact with the base plate 110.

In some implementations, when the press plate 140 is rotated from left to right in a state in which the trousers 105 are located between the base plate 110 and the press plate 140, the left elastic base part 115 is pressed first, and then the right elastic base part 116 is pressed.

In some implementations, the elastic base part 114 is elastically deformed to the left side about the fastening parts 113 by a predetermined angle. As a result, the pressure applied to the trousers is distributed, whereby the pressure is uniformly applied over the trousers.

The fixed base part 112 is disposed lower than the elastic base part 114. The fixed base part 112 is disposed closer to the door 20 than the elastic base part 114. As a result, a height difference is formed between the fixed base part 112 and the elastic base part 114.

The press avoiding part 111 is formed at the upper side of the fixed base part 112. In some implementations, the press avoiding part 111 is formed based on the height difference between the fixed base part 112 and the elastic base part 114. In some implementations, a groove may be formed in the fixed base part 112. In some implementations, the sewn part 106 of the trousers is located in the fixed base part 112.

The sewn part 106 of the trousers is constituted by overlapping pieces of fabric. As a result, the sewn part 106 of the trousers is thick. Unless the press avoiding part 111 is formed as described above, the pressure from the press plate 140 is concentrated on the sewn part 106 of the trousers. In this case, the pressure is not uniformly applied over the trousers.

In some implementations, the pressure is applied to the remaining parts of the trousers excluding the sewn part 106.

In addition, an elastic member 118 for elastically supporting the base plate 110 is disposed between the base plate 110 and the door 20.

In some implementations, a coil spring is used as the elastic member 118. In some implementations, a leaf spring may be used as the elastic member 118. In addition, elasticity may be provided based on the elastic force that generated from a member (e.g., a rib) integrally formed at the base plate 110.

In some implementations, elastic members 118 are disposed at the upper and lower sides of the left elastic base part 115 and the upper and lower sides of the right elastic base part 116.

In some implementations, the base plate 110 is provided with elastic member fixing parts 119, into which the elastic members 118 are fitted.

In some implementations, each of the elastic member fixing parts 119 is formed to have a hook shape.

A portion of the coil spring is caught and fixed by each of the elastic member fixing parts 119.

The elastic member fixing parts 119 are formed between the door 20 and the base plate 110. The elastic member fixing parts 119 are integrally formed at the base plate 110. In some implementations, the elastic member fixing parts 119 may be manufactured separately, and may then be assembled to the base plate 110.

The press plate 140 is opposite to the base plate 110.

The press plate 140 may be rotated relative to the base plate 110. In some implementations, the press plate 140 is rotated in a horizontal direction. In some implementations, the press plate 140 may be rotated in upward and downward directions.

The press plate 140 is formed so as to be flat.

The press plate 140 includes a press avoiding part 142 for avoiding interference between the press plate 140 and the sewn part 106 of the trousers and press parts 144 formed at the left and right sides of the press avoiding part 142 such that the press parts 144 are brought into tight contact with the elastic base part 114.

The press plate 140 is provided with an opening 145, through which steam is supplied to the trousers. In some implementations, the opening 145 is disposed so as to overlap the press avoiding part 142. In some implementations, the press avoiding part 142 and the opening 145 may be disposed separately. In some implementations, the opening 145 may be formed in the press parts 144.

In some implementations, a single opening 145 is formed. In some implementations, a plurality of openings 145 may be formed in the press plate 140, and the openings 145 may have various shapes or patterns.

In some implementations, both the press avoiding part 111 and the press avoiding part 142 are provided. In some implementations, any one selected from between the press avoiding part 111 formed in the base plate 110 and the press avoiding part 142 formed in the press plate 140 may be provided.

In some implementations, the press plate 140 is installed to press the trousers 105 while rotating relative to the base plate 110.

In some implementations, the wrinkle removal module 100 has an advantage in that the base plate is manufactured using a single plate material, whereby it is possible to effectively distribute pressure applied from the press plate to the base plate.

In some implementations, the wrinkle removal module 100 has an advantage in that the sewn part 106 of the trousers 105 is located in the base plate 110, which extends in the upward and downward directions, whereby it is possible to prevent pressure from being concentrated on the sewn part 106 of the trousers 105 and thus to uniformly apply the pressure over the trousers 105 such that wrinkles can be effectively removed from the trousers 105.

In some implementations, the door 20 may be installed so as to be opened from left to right or from right to left based on the position at which the hinge unit 24 is installed.

The press plate 140 of the wrinkle removal module 100 is configured to have a reversible structure 130 in which the press plate 140 can be opened from right to left or from left to right depending upon the direction in which the door 20 is opened.

The door 20 may be installed such that the door 20 can be opened from left to right or from right to left. The direction in which the door 20 is opened may be selected in order to efficiently use the space in which the clothes treatment apparatus is installed or based on user preference.

In some implementations, in which the door 20 is installed so as to be opened from left to right, as shown in FIG. 1, the press plate 140 is installed so as to be rotated from right to left.

In some implementations, in which the door 20 is installed so as to be opened from right to left, on the other hand, the press plate 140 is installed so as to be rotated from left to right.

As described above, the reversible structure 130 is configured to change the direction in which the press plate 140 is opened.

Figure 5:
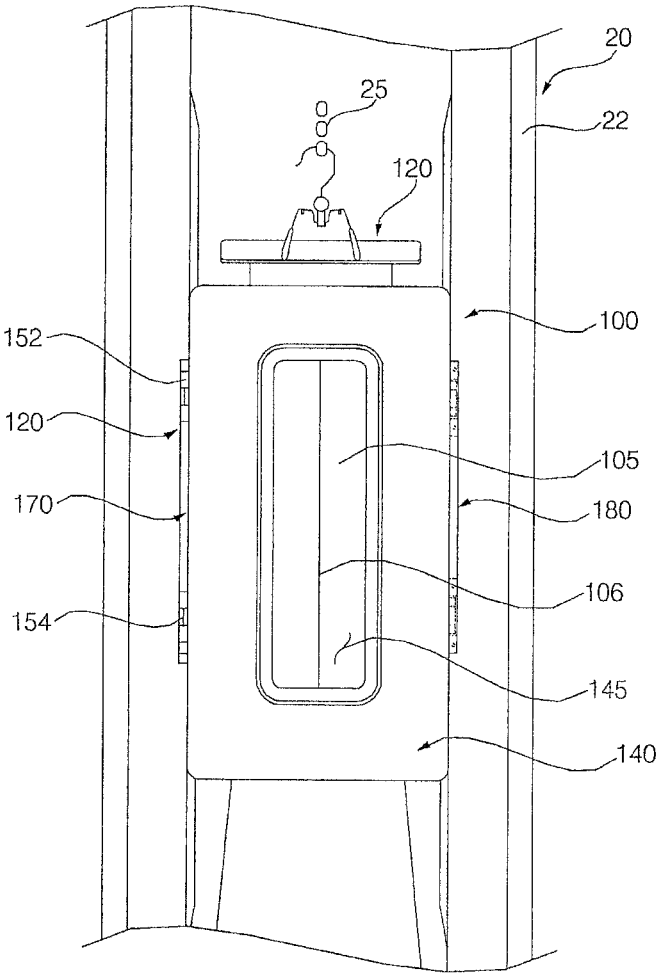
FIG. 5 is a view of an example wrinkle removal module.
Figure 6:
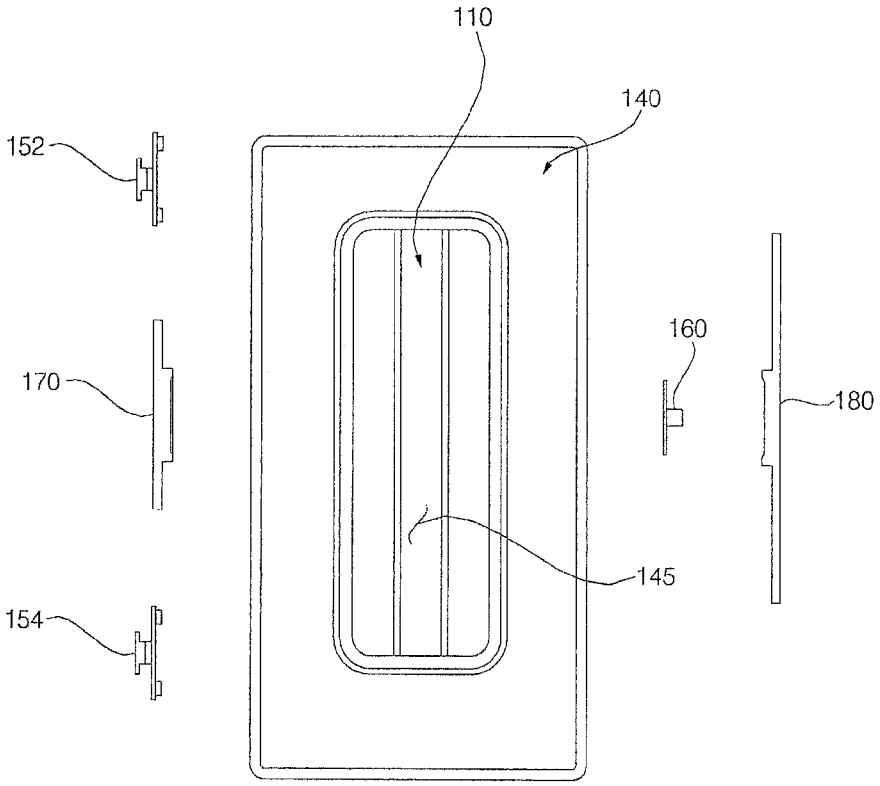
FIG. 6 is an exploded view of an example wrinkle removal module.
Figure 7:
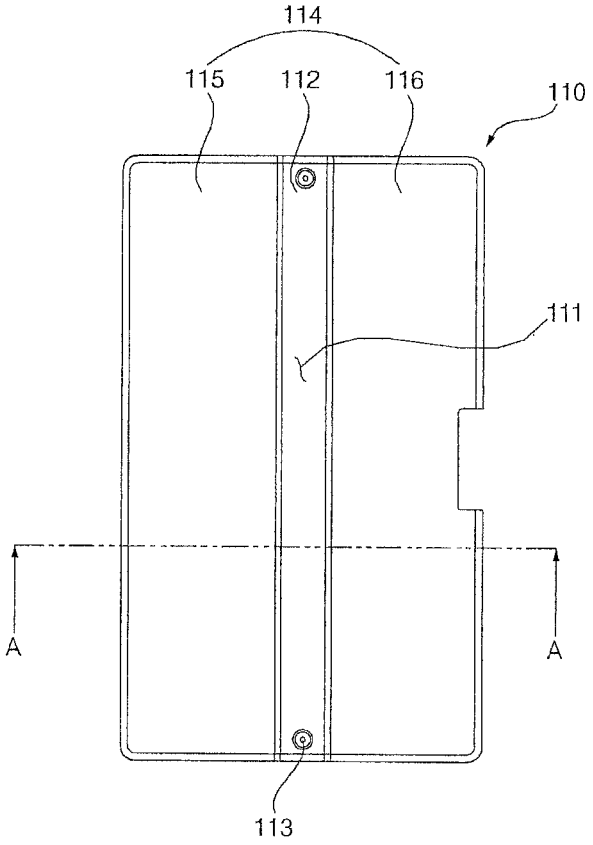
FIG. 7 is a front view of an example base plate.
Figure 8:
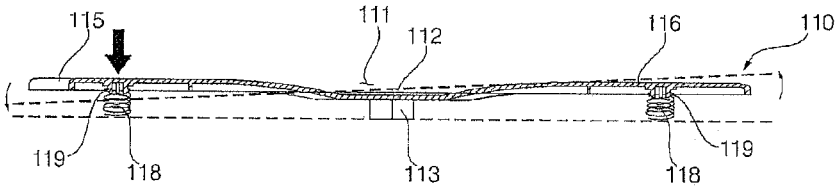
FIG. 8 is a bottom view of an example base plate.
Figure 9:
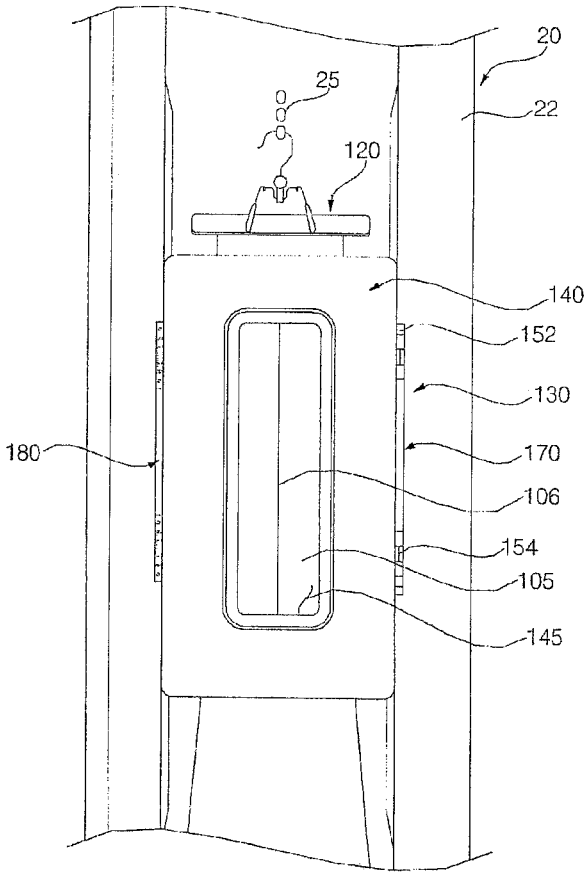
FIG. 9 is a view of an example wrinkle removal module when the opening and closing direction of the example wrinkle removal module is reversed as compared to FIG. 5.
Figure 10:
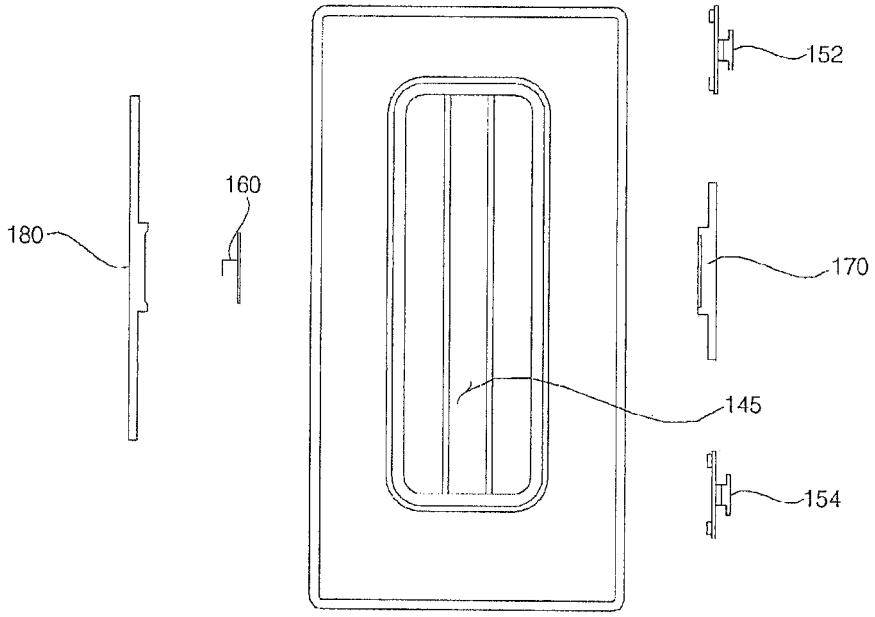
FIG. 10 is an exploded view of an example wrinkle removal module.

FIGS. 5, 6, and 10 illustrate example wrinkle removal modules. FIGS. 7 and 8 illustrate example base plates. FIG. 9 is a view of an example wrinkle removal module when the opening and closing direction of the example wrinkle removal module is reversed as compared to FIG. 5.

The reversible structure 130 includes a first hinge 152 and a second hinge 154 coupled to one side of the base plate 110 and one side of the press plate 140 for allowing the press plate 140 to be rotated thereabout, a latch 160 installed at the other side of the base plate 110 and the other side of the press plate 140 for fixing the press plate 140 to the base plate 110 when the press plate 140 is brought into tight contact with the base plate 110, a cap cover 170 disposed between the first hinge 152 and the second hinge 154, and a camouflage cover 180 installed at the other side of the base plate 110 and the other side of the press plate 140.

In some implementations, the structure in which the press plate 140 is installed so as to be rotated from right to left will be described by way of example (see FIGS. 1, 5, and 6).

The first hinge 152 is disposed at the upper end of the left side of the base plate 110, and then the press plate 140 is connected to the base plate 110 via the first hinge 152.

The second hinge 154 is disposed at the lower end of the left side of the base plate 110, and then the press plate 140 is connected to the base plate 110 via the second hinge 154.

The cap cover 170 is inserted into an empty space defined between the first hinge 152 and the second hinge 154. The cap cover 170 may be located between the base plate 110 and the press plate 140.

The latch 160 is installed at the other side of the press plate 140, which is opposite to the first hinge 152 and the second hinge 154.

When the press plate 140 is pushed toward the base plate 110 such that the press plate 140 is brought into tight contact with the base plate 110, the press plate 140 and the base plate 110 catch on each other through the hook coupling of the latch 160. When the press plate 140 is pushed again toward the base plate 110 in a state in which the press plate 140 and the base plate 110 catch on each other through the hook coupling of the latch 160, the hook coupling of the latch 160 is released. The latch 160 is configured to achieve one-touch hook coupling.

The camouflage cover 180 is located opposite to the cap cover 170.

The camouflage cover 180 is provided to prevent the first hinge 152, the second hinge 154, and the cap cover 170 from being exposed to a user. The camouflage cover 180 hides the first hinge 152, the second hinge 154, and the cap cover 170.

The camouflage cover 180 is fixed to any one selected from between the base plate 110 and the press plate 140. The camouflage cover 180 is installed at the entrance at which the press plate 140 opens.

In some implementations, the camouflage cover 180 is installed at the base plate 110.

The shape of the camouflage cover 180 corresponds to the shapes of the first hinge 152, the second hinge 154, and the cap cover 170. As a result, the left and right shapes of the wrinkle removal module 100 are the same.

The state shown in FIG. 5 may be reversed to the state shown in FIG. 9. As shown in FIGS. 9 and 10, the first hinge 152, the second hinge 154, and the cap cover 170 may be installed at the right side of the press plate 140, and the camouflage cover 180 may be installed at the left side of the press plate 140, thereby achieving the reverse installation of the wrinkle removal module 100.

The wrinkle removal module 100 may be installed in a state in which the direction in which the wrinkle removal module 100 is opened and closed is selected based on user preference.

In the wrinkle removal module 100, the direction in which the press plate 140 is opened and closed may be set to interlock with the direction in which the door 20 is opened and closed.

In the clothes treatment apparatus, the direction in which the door 20 or the wrinkle removal module 100 is opened and closed may be selected based on the user's physical characteristics, for example, based on whether the user is a handicapped person or a left-handed person.

As is apparent from the above description, the clothes treatment apparatus has the following effects.

First, the base plate may be manufactured using a single plate material, whereby it is possible to effectively distribute pressure applied from the press plate to the base plate.

Second, when pressure is nonuniformly applied from the press plate to the base plate, the base plate may be deformed, whereby it is possible to uniformly distribute the pressure over the trousers.

Third, the plate may be deformed or rotated about the fastening parts formed at the base plate, whereby it is possible to balance the pressure.

Fourth, pressure may be prevented from being concentrated on the sewn part of the clothes by the provision of the press avoiding part, whereby it is possible to uniformly apply the pressure over the clothes.

Fifth, the wrinkle removal module may be configured such that the wrinkle removal module can be opened from left to right or from right to left based on the user's selection.

Sixth, the direction in which the press plate of the wrinkle removal module is opened and closed may be selected to interlock with the direction in which the door is opened and closed.

What is claimed is:

1. A clothes treatment apparatus comprising:
- a cabinet that defines a treatment chamber;
- a door that is configured to open and close at least a portion of the cabinet; and
- a wrinkle removal module that is located on an inside of the door, that is configured to remove wrinkles from clothes by applying pressure to the clothes, and that comprises:
  - a base plate that is located at the door and that is configured to support clothes; and
  - a press plate [that is coupled to the base plate,] that is configured to rotate relative to the base plate, and that is configured to remove wrinkles from clothes based on pressing against the base plate,
- wherein at least one of the base plate or the press plate includes a press avoiding part that is configured to receive a sewn part of clothes and that defines a groove.

2. The clothes treatment apparatus according to claim 1, wherein at least a portion of the base plate is separated from the door by a predetermined distance.

3. The clothes treatment apparatus according to claim 1, wherein the base plate comprises a material that generates an elastic force that presses the base plate against the press plate.

4. The clothes treatment apparatus according to claim 1, wherein the press plate comprises a material that generates an elastic force that presses the press plate against the base plate.

5. The clothes treatment apparatus according to claim 1, wherein the press plate is configured to rotate relative to the base plate in upward and downward directions or in leftward and rightward directions.

6. A clothes treatment apparatus comprising:
- a cabinet that defines a treatment chamber;
- a door that is configured to open and close at least a portion of the cabinet; and
- a wrinkle removal module that is located on an inside of the door, that is configured to remove wrinkles from clothes by applying pressure to the clothes, and that comprises:
  - a base plate that is located at the door, that is configured to support clothes, and that comprises:
    - a fixed base part that is fixed to the door; and
    - an elastic base part that extends from the fixed base part, that is separated from the door by a greater distance than the fixed base part, and that is configured to support clothes using elastic force; and
  - a press plate [that is coupled to the base plate,] that is configured to rotate relative to the base plate, and that is configured to remove wrinkles from clothes based on pressing against the base plate.

7. The clothes treatment apparatus according to claim 6, wherein the fixed base part includes a press avoiding part that is configured to receive a sewn part of clothes and that defines a groove.

8. The clothes treatment apparatus according to claim 6, wherein the fixed base part is configured to be closer to the door than the elastic base part.

9. The clothes treatment apparatus according to claim 6, wherein the fixed base part includes a fastening part that protrudes toward the door, that is supported by the door, and that is configured to separate the fixed base part from the door.

10. The clothes treatment apparatus according to claim 9, wherein the base plate is configured to rotate about the fastening part through a predetermined angle based on being pressed by the press plate.

11. The clothes treatment apparatus according to claim 6, wherein the elastic base part comprises:
- a left elastic base part that extends from the fixed base part in a leftward direction; and
- a right elastic base part that extends from the fixed base part in a rightward direction.

12. The clothes treatment apparatus according to claim 6, wherein the press plate defines an opening that is configured to expose clothes to the treatment chamber.

13. The clothes treatment apparatus according to claim 6, wherein the base plate further comprises an elastic member that is located between the elastic base part and the door and that is configured to provide elastic force to the elastic base part.

14. The clothes treatment apparatus according to claim 13, wherein the base plate further comprises an elastic member fixing part that is located at the elastic base part, that protrudes toward the door, that is configured to connect at least a portion of the elastic base part to the elastic member fixing part.

15. The clothes treatment apparatus according to claim 14, wherein:

the elastic member is a coil spring, and at least a portion of the coil spring is connected to the elastic member fixing part.

16. The clothes treatment apparatus according to claim 1, wherein the wrinkle removal module further comprises:

a first hinge [that is coupled to a first side of the base plate,] that is coupled to a first side of the press plate, and that is configured to allow rotation of the press plate;

a second hinge [that is coupled to the first side of the base plate,] that is coupled to the first side of the press plate, and that is configured to allow rotation of the press plate; and a latch that is located at a second side of the base plate or a second side of the press plate, that is located opposite the first hinge and the second hinge, and that is configured to latch the press plate and the base plate.

17. The clothes treatment apparatus according to claim 16, wherein the wrinkle removal module further comprises a cap cover that is located between the first hinge and the second hinge and that is located between the base plate and the press plate.

18. The clothes treatment apparatus according to claim 17, wherein the wrinkle removal module further comprises a camouflage cover that is located at the second side of the base plate or the second side of the press plate and that is located at positions opposite the first hinge, the second hinge, and the cap cover.

19. A clothes treatment apparatus comprising:

a cabinet that defines a treatment chamber;

a door that is configured to open and close at least a portion of the cabinet; and a wrinkle removal module that is located on an inside of the door, that is configured to remove wrinkles from clothes by applying pressure to the clothes, and that comprises:

a base plate that is located at the door and that is configured to support clothes;

a press plate [that is coupled to the base plate,] that is configured to rotate relative to the base plate, and that is configured to remove wrinkles from clothes based on pressing against the base plate;

a first hinge [that is coupled to a first side of the base plate,] that is coupled to a first side of the press plate, and that is configured to allow rotation of the press plate;

a second hinge [that is coupled to the first side of the base plate,] that is coupled to the first side of the press plate, and that is configured to allow rotation of the press plate;

a latch that is located at a second side of the base plate or a second side of the press plate, that is located opposite the first hinge and the second hinge, and that is configured to latch the press plate and the base plate;

a cap cover that is located between the first hinge and the second hinge and that is located between the base plate and the press plate; and a camouflage cover that is located at the second side of the base plate or the second side of the press plate and that is located at positions opposite the first hinge, the second hinge, and the cap cover.

*20. The clothes treatment apparatus according to claim 1, further comprising a fastening part that is located between the base plate and the door to space apart the base plate from the door,*

*wherein the base plate is formed as a single plate and is configured to be rotatable about the fastening part when the base plate is pressed by the press plate.*

* * * * *